United States Patent [19]
Bryner et al.

[11] 4,067,116
[45] Jan. 10, 1978

[54] GEOMETRIC PITCH DETERMINING DEVICE

[75] Inventors: Alex M. Bryner, Menlo Park, Calif.; Richard P. Laird, Peoria, Ill.

[73] Assignee: Caterpillar Tractor Co., Peoria, Ill.

[21] Appl. No.: 428,407

[22] Filed: Dec. 26, 1973

[51] Int. Cl.² .......................... G01B 3/56; G01C 9/28
[52] U.S. Cl. .................................. 33/343; 33/174 C
[58] Field of Search ................ 33/1 N, 174 C, 343, 33/349, 389

[56] References Cited

U.S. PATENT DOCUMENTS

| | | | |
|---|---|---|---|
| 1,245,340 | 11/1917 | Heath | 33/343 |
| 1,932,103 | 10/1933 | Godfrey | 33/174 C |
| 2,013,850 | 9/1935 | Marishal | 33/343 |
| 2,214,622 | 9/1940 | Lorenzen | 33/174 C |
| 2,737,726 | 3/1956 | Christiansen | 33/174 C |

FOREIGN PATENT DOCUMENTS

| | | | |
|---|---|---|---|
| 51,576 | 10/1910 | Austria | 33/174 C |
| 195,558 | 4/1923 | United Kingdom | 33/174 C |

*Primary Examiner*—Richard E. Aegerter
*Assistant Examiner*—Richard R. Stearns
*Attorney, Agent, or Firm*—Phillips, Moore, Weissenberger, Lempio & Majestic

[57] ABSTRACT

A hand operable device for conveniently determining geometric pitch of propellers. The device includes a level indicating device and a support means therefor. The support means has pressure surfaces engaging protrusions disposed thereon in a plane oblique to the axis of the level indicating device. The configuration is such that the axis of the level indicating device will lie in a horizontal plane only when the propeller pressure surface engaging protrusions are disposed upon a pressure surface of the propeller at a given distance from the axis of rotation thereof. Upon measurement of the distance from the axis of rotation of the propeller to the level indicating device, one may readily calculate the geometric pitch of the propeller by multiplying such distance by a constant characteristic value of the device.

5 Claims, 5 Drawing Figures

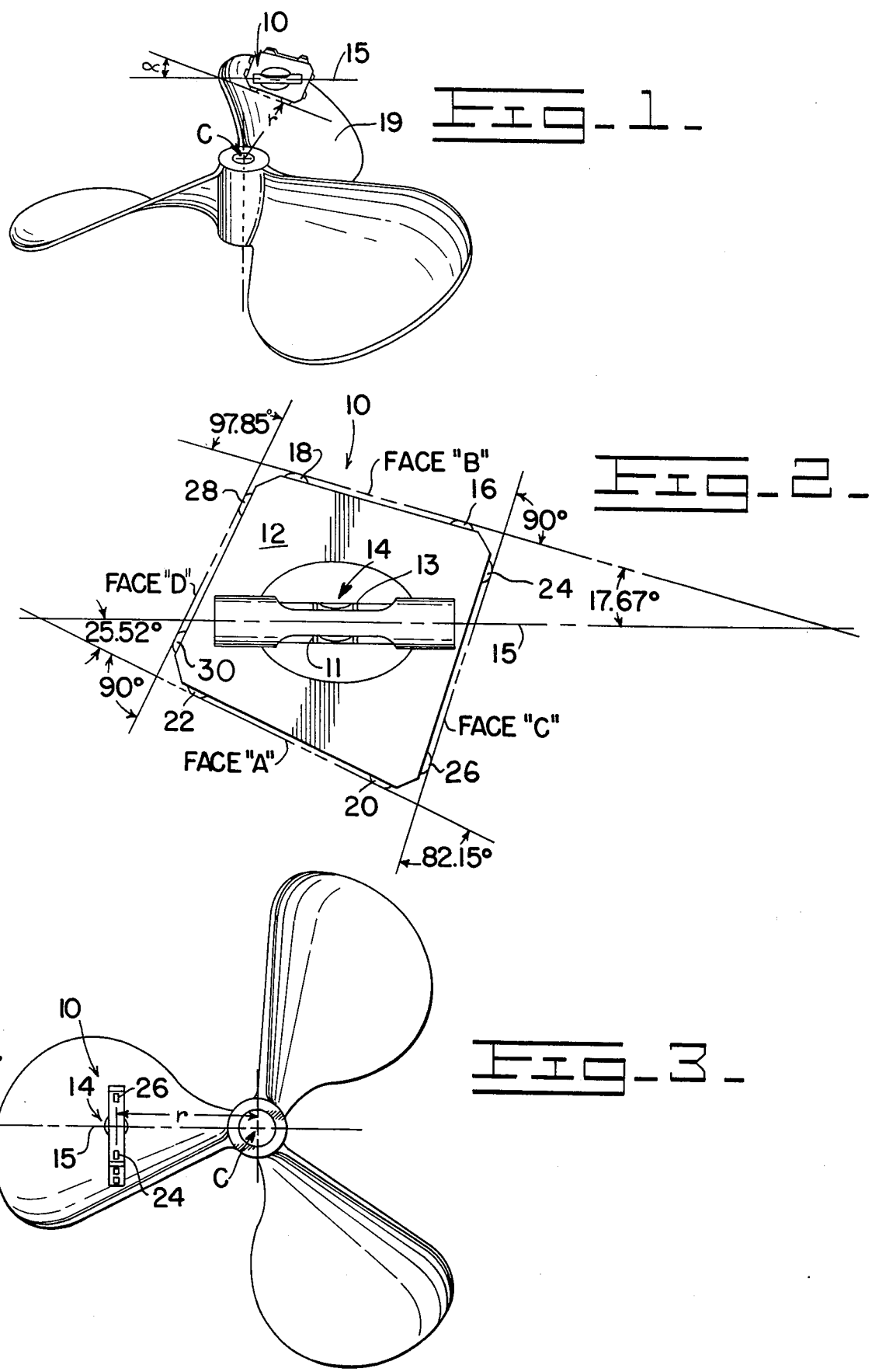

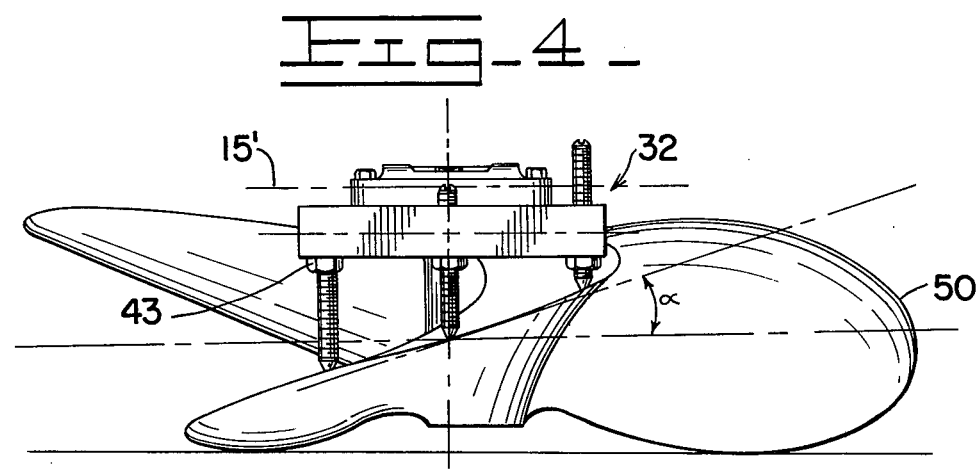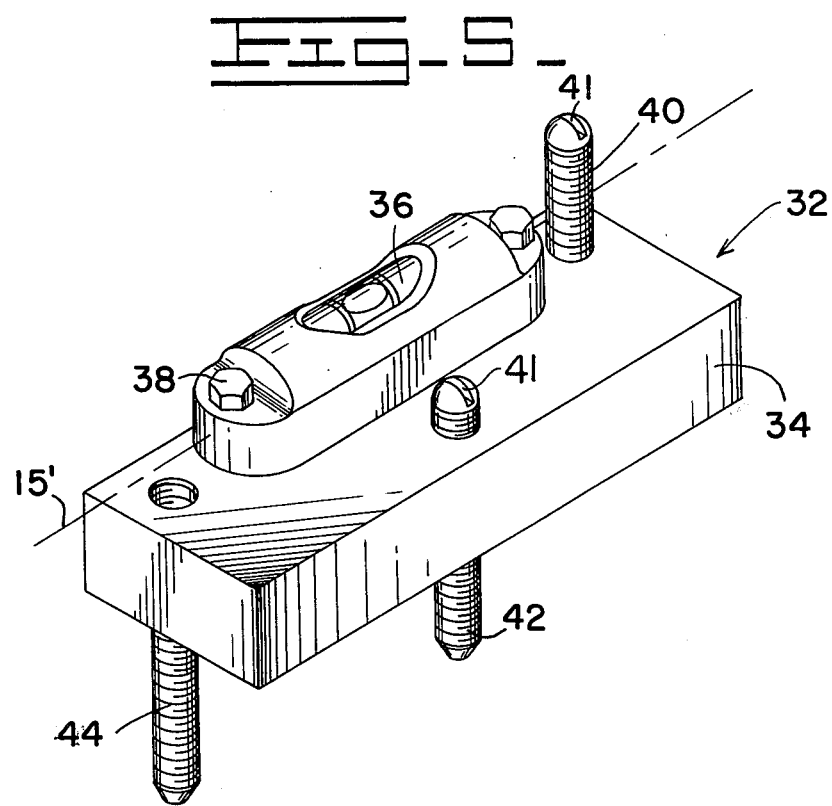

GEOMETRIC PITCH DETERMINING DEVICE

BACKGROUND OF THE INVENTION

In propeller driven marine vehicle applications, it is critically important to properly match power, thrust, and speed requirements with an appropriately designed propeller. The performance of a particular propeller depends upon many parameters including the number of blades, the propeller diameter, the blade area, and the geometric pitch of the propeller. Of these parameters, geometric pitch, or the theoretical axial advance of a propeller through the water per single blade revolution, has traditionally been somewhat cumbersome if not difficult to determine.

Prior to the instant invention, measurement of geometric pitch often required dismounting the propeller from its shaft and vehicle and measurement of pitch by means of bulky, semi-portable and often elaborate instruments. Some prior art pitch measuring devices are shown in U.S. Pat. Nos. 1,547,380 to Godfrey; 1,696,525 to Cooledge; 2,132,407 to Fowler; 2,172,368 to Eby; 2,248,973 to Eby; 2,383,527 to Whitechester; and 2,421,754 to Little et al.

It has been determined that the geometric pitch for a given propeller is a constant distance which distance depends directly upon the average blade angle or angle of attack of the propeller. In a properly designed propeller the angle of attack for each blade element diminishes as the radial distance from the axis of rotation of the propeller increases. This gradual decrease in blade angle gives the propeller blade its twisted appearance. For a propeller having a given pitch, a given angle of attack will exist at only one radial distance ($r$) from the axis of rotation of the propeller. From this premise, the following relationship between pitch, angle of attack, and distance from the center of rotation has evolved:

$$P = 2\pi r \tan \alpha$$

Where $P$ = the geometric pitch of the propeller;
$2\pi$ = a constant;
$r$ = the radial distance from the axis of rotation to the point of measurement; and
$\alpha$ = the angle between a line drawn tangent to the pressure face of a blade and the plane of rotation of the propeller.

SUMMARY AND OBJECTS OF THE INVENTION

The instant invention provides a hand manipulable portable device for accurately determining geometric pitch. The device is constructed to locate a given angle of attack on a pressure surface of a propeller blade so that the radial distance between the axis of rotation of the propeller and the point at which this angle occurs may be measured and utilized to directly calculate the geometric pitch of the propeller. The device includes a leveling device which enables the observer to locate the desired angle of attack with respect to the axis of rotation of the propeller.

The main object of the present invention is to provide a determining device the construction of which is based upon the premise that a propeller having a given pitch and a helicoidal pressure surface will have an angle of attack of a given value at only one radial distance from the axis of rotation of the propeller.

Another object of this invention is to provide a pitch determining device which may be hand carried and which is simple in construction and operation.

A further object of the present invention is to provide a propeller pitch determining device which may be utilized without dismounting the propeller.

Other objects and advantages of the present invention will become apparent from the following description and drawings.

BRIEF DESCRIPTION OF THE DRAWINGS

FIG. 1 is an isometric view of a marine propeller showing the preferred embodiment of the instant invention in operative position thereupon;

FIG. 2 is an elevation of the invention shown utilized in FIG. 1;

FIG. 3 is an elevation of a propeller disposed for rotation in a vertical plane;

FIG. 4 is an elevation of an alternate embodiment of the instant pitch determining device shown positioned upon a horizontally disposed propeller; and FIG. 5 is an isometric view of the alternate pitch determining device shown in FIG. 4.

DETAILED DESCRIPTION

With reference to the drawings, the preferred embodiment of the instant pitch determining device is shown generally at 10. The device includes a flat plate-like support member 12 which has two flat sides and four faces or edge portions A, B, C, and D as shown in FIGS. 2 and 3. Each of these faces lies within a flat plane disposed at a given angle with respect to the plane of the other faces.

Face B and face C as well as faces A and D lie respectively in planes normal to one another. Face A and face C, however, lie in planes which intersect at an angle of 82.15° and the plane of face B makes an angle with the plane of face D of 97.85°. Each face is provided with a pair of protuberances or engagement points 16, 18, 20, 22, 24, 26, 28, and 30 for engagement with the pressure surface of a propeller blade, as shown in FIG. 1.

Attached to the support member 12 is a level indicating device 14 which may be of the reversion type and which has an accuracy tolerance of plus or minus 10 minutes. The device has suitable centering marks or indicia 11 and 13 between which an air bubble will reside when the axis 15 of a liquid-containing vial lies in a horizontal plane. As may be seen in FIG. 2, the level indicating device 14 extends longitudinally along the axis 15 which axis is disposed obliquely with respect to a line drawn through the propeller pressure surface engaging protuberances 20 and 22 of face A. In the preferred embodiment, the particular angle between the axis 15 and the line drawn through such protuberances is 25.52°. The angle 25.52° corresponds to the angle of attack ($\alpha$) at a given point on the pressure surface of a propeller blade 19 at which the level indicating device 14 will have its axis 15 disposed within a horizontal plane while the protuberances 20 and 22 engage the pressure surface.

The angle of attack ($\alpha$) is best appreciated with reference to FIGS. 4 and 1. ($\alpha$) is the angle between the plane or rotation of the propeller and a line drawn tangent to the pressure surface of the propeller. As previously discussed, there is only one radial distance ($r$) from the center of rotation ($c$) of the propeller to a point on the propeller blade which has a given angle of attack ($\alpha$). The instant invention locates such point on the pressure surface so that the distance (r) may be measured and applied in the above-discussed pitch equation ($P = 2\pi r \tan \alpha$) to yield geometric pitch.

In the preferred embodiment, the angle ($\alpha$) of 25.52° is utilized because the value of the tangent of 25.52° is $3/2\pi$ and this value, when inserted in the pitch equation, yields an integral multiplier which simplifies calculations. Another convenient value for alpha which can be used is 17.67°, the tangent of which is $1/\pi$. As may be readily appreciated from the geometry of the structure shown in FIG. 2, 17.67° is the angle between the axis 15 and a line drawn through the protuberances 16 and 18 of face B. As will be more fully appreciated hereinafter, the angle 17.67° is substituted in the pitch equation in lieu of 25.52° when the protuberances of face B are utilized as pressure surface engaging means instead of those of face A.

The preferred embodiment 10 of the present invention may be utilized to determine the geometric pitch of a propeller dismounted and disposed upon a horizontal surface (FIG. 1) and may also be utilized to determine the pitch of a propeller mounted upon a marine vehicle and having a vertical plane of rotation (FIG. 3). To determine the pitch of a dismounted propeller, the propeller is placed upon a horizontal surface and that is shown in FIGS. 1 and 4. The device is placed upon the pressure surface of one of the blades with the protuberances of either face A or face B engaging the pressure surface. Then the device 10 is moved radially inwardly and outwardly with respect to the axis of rotation of the propeller until the air bubble in the level indicator 14 is centered between the indicia 11 and 13. The distance (r) from the center of rotation (c) to the point at which the level indicating device signals the horizontal disposition of the axis 15 is measured by convenient means such as a scale. The value of (r) and the value of the tangent of ($\alpha$); i.e., $3/2\pi$ for face A and $1/\pi$ for face B, are inserted into the pitch equation for the simple calculation of the geometric pitch of the propeller under investigation.

The manner of determining the pitch of a propeller which is mounted upon a marine vehicle and which has a vertical plane of rotation is readily appreciated with reference to FIG. 3. As shown, the propeller is rotated until one its blades extends radially along a horizontal line 17. The device 10 is then placed upon the blade such that the protuberances of either the face D or the face C engage the pressure surface of the blade while the line 17 is normal to the opposite sides of the member 12. The device is then moved radially along the line 17 until such time as the level indicator 14 shows the axis 15 disposed in a horizontal plane. At this point, the distance (r) is measured and, as in the previous example, applied in the basic pitch equation with an appropriate value of ($\alpha$) to yield the geometric pitch of the mounted propeller under investigation.

FIGS. 4 and 5 show another embodiment of the invention which operates on the same principle as the preferred embodiment but which is adjustable and which is adapted only for use in determining the geometric pitch of a dismounted propeller which may be conveniently placed upon a horizontal surface.

The device, shown generally at 32, includes three threaded leg members 40, 42, and 44 threadably engaged within a supporting block member 34. Lines drawn through the distal ends of each of the three leg members form a triangular configuration conducive to the balanced support of the block member 34 by means of engagement of the leg members with a surface. Each leg member is provided with a slot 41 for receiving a screwdriver or other tool for axial adjustment purposes. Lock nuts 43 are also provided to assure that the leg members will remain in selected axial positions. As in the preferred embodiment, a leveling device 36 is provided and is attached to the support block member 34 by means of bolts 38 or the like.

The utilization of the device 32 is essentially identical to that of the preferred embodiment 10 except that the angled faces and protuberances of the device 10 are replaced by the three legs 40, 42, and 44 which legs are adjusted so that the distal pressure surface engaging end portions thereof lie within a plane disposed in relation to the horizontal plane of rotation of the propeller 50 at an angle ($\alpha$) corresponding to the angle of attack of the particular blade portion under investigation. As shown in FIG. 4, in operation, the device is placed upon the pressure surface of a propeller blade with the blade resting upon a horizontal surface. The device is then moved radially along the blade from the center of rotation thereof until the leveling device 36 indicates that the axis 15' is disposed within a horizontal plane parallel to the plane of rotation of the propeller. When this is accomplished, the distance (r) between the placement point and the center of rotation of the propeller is measured and appropriate values are inserted into the pitch equation for the ready calculation of geometric pitch in the previously described manner.

While the invention has been described with reference to the two primary embodiments thereof, it is apparent that variations and modifications are possible within the purview of the inventive concepts. No limitation with respect to such variations and modifications is intended, except by the scope of the claims.

We claim:

1. A device used in determining the geometric pitch of an accurately formed propeller disposed horizontally or vertically having a hub portion with a center of rotation and having a blade extending radially outwardly from said hub portion with a pressure surface thereon, said device comprising: level means, said level means including a first axis, said level means operative for indicating when said first axis is disposed in a horizontal plane, said device having support means for supporting said level means thereupon, said support means including at least first and second engagement means for operatively engaging said pressure surface, first and second of said engagement means lying in a first predetermined plane which is oblique to and intersected by said first axis at a first predetermined angle, said first predetermined angle being such that said first axis is disposed in a horizontal plane with said engagement in operative engagement with said pressure surface only when said device is disposed upon said blade at a first predetermined radial distance from said center of rotation of said hub portion, said support means including a flat plate member having a plurality of faces and having two opposed parallel side surfaces, said at least first and second engagement means include first and second protuberances extending outwardly from one of said faces, said flat plate member including four faces, and said at least first and second engagement means further include third, fourth, fifth, sixth, seventh and eighth protuberances, a pair of said protuberances extending from each of said faces other than said one of said faces.

2. The invention of claim 1 wherein said fourth and third protuberances lie within a second predetermined plane, said fifth and sixth protuberances lie within a third predetermined plane and said seventh and eighth protuberances lie within a fourth predetermined plane.

3. The invention of claim 2 wherein said first and fourth predetermined planes are disposed normal to one another.

4. The invention of claim 3 wherein said second and third predetermined planes are disposed normal to one another.

5. The invention of claim 4 wherein said second and said fourth predetermined planes are disposed with respect to one another at an angle of 97.85°.

* * * * *